United States Patent [19]  [11]  4,386,825
Stalcup et al.  [45]  * Jun. 7, 1983

[54] COOLED, THERMALLY STABLE COMPOSITE MIRRORS

[75] Inventors: Robert K. Stalcup, Lake Park, Fla.; Karl M. Prewo, Vernon, Conn.

[73] Assignee: United Technologies Corporation, Hartford, Conn.

[*] Notice: The portion of the term of this patent subsequent to Mar. 17, 1998, has been disclaimed.

[21] Appl. No.: 219,771

[22] Filed: Dec. 23, 1980

Related U.S. Application Data

[63] Continuation-in-part of Ser. No. 54,098, Jul. 2, 1979, Pat. No. 4,256,378.

[51] Int. Cl.³ .......................... G02B 5/10; G02B 7/18
[52] U.S. Cl. ................................................... 350/310
[58] Field of Search .............................. 350/310, 288

[56] References Cited

U.S. PATENT DOCUMENTS 3,131,238  4/1964  Carnall, Jr. et al. ................. 264/1
3,311,522  3/1967  Ladd et al. .......................... 156/306
3,711,936  1/1973  Athey et al. .......................... 29/475
3,824,301  7/1964  Carnall, Jr. et al. ................. 423/561
4,214,818  7/1980  Choyke et al. ....................... 350/310
4,221,469  9/1980  Stalcup et al. ....................... 350/310
4,256,378  3/1981  Prewo et al. ......................... 350/310

FOREIGN PATENT DOCUMENTS 2215631  8/1974  France ................................ 350/310

OTHER PUBLICATIONS

Thompson et al., Research on Graphite Reinforced Glass Matrix Composites, NASA Contract Report 158946, Jun. 1978.

Primary Examiner—Jon W. Henry
Attorney, Agent, or Firm—Harry J. Gwinnell

[57] ABSTRACT

Laser mirrors of high thermal conductivity and dimensional stability at high temperatures are disclosed which also contain cooling channels in close proximity to the laser radiation reflecting surface. Methods of making the same are also disclosed comprising using channel forming inserts laid up between layers of the graphite fiber and glass composition which are then hot pressed and removed either by the application of mechanical pressure or chemical dissolution. Alternatively, such inserts are laid on the mold and the graphite-glass composition hot pressed on the inserts which are then mechanically removed followed by bonding a flat sheet of a separately formed graphite-glass composite to the grooved surface. Another method includes forming grooves in a preformed graphite-glass composite followed by filling the grooves with channel forming inserts and hot pressing additional graphite-glass on the inserts.

5 Claims, 6 Drawing Figures

COOLED, THERMALLY STABLE COMPOSITE MIRRORS

This is a continuation-in-part of application Ser. No. 54,098, filed July 2, 1979 now U.S. Pat. No. 4,256,378.

DESCRIPTION

1. Technical Field

The field of art to which this invention pertains is composite optical elements of the reflecting type, and specifically laser radiation reflecting elements.

2. Background Art

While there is a myriad of art covering laser mirrors (e.g., U.S. Pat. Nos. 3,836,236; 3,926,510; and 3,942,880) because of the many peculiar physical property requirements of such mirrors in this environment, both a variety of materials and designs have been employed in attempts to optimize the particular properties necessary for a composite used in this particular environment. For example, while a laser mirror in this environment must have the requisite reflective properties, cost and availability of materials as well as ease of fabrication are also important factors. Such mirrors should also desirably have low density for ease of use in the types of apparatus where they will be used, but without porosity. Furthermore, such mirrors ideally should have high elastic stiffness and high strength along with high fracture toughness. And stability is of the utmost importance both from the point of view of the fine resolution-type work environment the mirrors will be used in, and the inaccessibility of the apparatus which these mirrors would be used in, for example, other space applications. These stability properties include low thermal expansion, high thermal conductivity, and environmental stability. Environmental stability includes such things as dimensional stability and mirror integrity regardless of moisture conditions, vacuum conditions, or ultraviolet light exposure, and mirror integrity and dimensionally stability at both high and low temperatures. Currently, laser mirrors are basically either highly polished metal blocks (high energy laser application) or graphite reinforced resin matrix composites (low energy laser application). However, currently used composites fall off in one or more of the above-cited property areas. Furthermore, the popular use of resins in conventional composites of the above type inherently suffer from dimensional changes due to absorption or desorption of moisture, evolution of organic constituents due to prolonged exposure to high vacuum, breakdown due to prolonged exposure to ultraviolet radiation, low thermal conductivity, high coefficients of thermal expansion, and rapid decrease in integrity when used above 300° C. And while cooling channels have been provided in such mirrors in an attempt to achieve some of the above-cited property goals, relatively complicated manufacturing procedures have been necessary to produce such articles and still the coefficients of thermal expansion, thermal stability, and integrity of the mirrors produced have not been totally satisfactory from the point of view of mirror properties and duration of use. Furthermore, because of the limitations imposed by the use of conventional laser mirror materials, design options for cooling channel shapes is limited.

DISCLOSURE OF INVENTION

The present invention is directed to thermally stable laser radiation reflecting mirrors useful at high temperatures with low coefficients of thermal expansion, high thermal integrity, low density, high elastic stiffness, high strength and high fracture toughness useful over a wide range of temperature conditions, comprising a graphite fiber reinforced glass matrix mirror with a plurality of hollow cooling passages in close proximity to the reflecting surface.

Another aspect of the invention includes a relatively simple method of fabricating such mirrors comprising laying up the graphite-glass composite material around a plurality of channel forming inserts laid up in a pattern of the desired coolant passages, followed by hot pressing the composite material and channel forming strips and subsequently removing the inserts to form such coolant passages.

Another aspect of the invention includes a relatively simple method of fabricating such mirrors comprising forming a lay-up of a plurality of channel forming inserts on a mold surface in a pattern of the desired coolant passages, laying up the graphite-glass composite material on such inserts, hot pressing the composite material and insert lay-up and removing the inserts. Following this, the walls of the coolant passages are completed by laminating a graphite-glass composite material hot pressed absent the strips to the coolant passage side of the channeled composite. The inserts may, alternatively, be removed after lamination.

Another aspect of the invention includes a relatively simple method of fabricating such mirrors comprising hot pressing a graphite-glass composite material, forming cooling grooves in one side of such material, filling the grooves with channel forming strips to maintain such grooves open during subsequent processing, and laying the graphite-glass compositions onto the filled grooves followed by hot pressing. The strips are subsequently removed, thus forming the laser mirror with enclosed cooling grooves.

The foregoing, and other features and advantages of the present invention, will become more apparent from the following description and accompanying drawing.

BEST MODE FOR CARRYING OUT THE INVENTION

Figure 1:
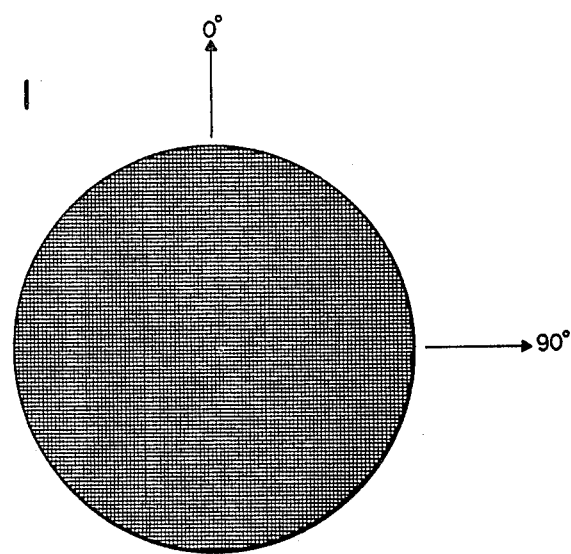
FIG. 1 shows a top view of a composite mirror according to the present invention.

While any graphite fiber with the requisite high strength and good modulus of elasticity can be used in the laser mirrors of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa ($77 \times 10^6$ psi). It has a tensile strength of 1724 MPa (250 ksi) and a density of 1.96 gm/cm$^3$. The fiber is used at about 40 to 70% by volume based on the graphite-glass composite and preferably at about 60% by volume.

The glass used was particularly selected to have a very low coefficient of thermal expansion preferably matched closed, but not equal to that of the graphite fibers used since the graphite has a highly negative axial coefficient of thermal expansion and the glass has a positive but small coefficient of thermal expansion. Particularly suitable for the purposes of this invention is a borosilicate glass (Corning Glass Works CGW 7740) with an anneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C.$\times 10^{-7}$ and a modulus of elasticity of $9.1 \times 10^6$ psi. The particle size of the glass should be such that at least 90% passes through a 36.0 mesh screen.

While there are a variety of methods which may be used according to the present invention, the preferred method comprises continuously unwinding a tow of graphite fibers from a spool at a moderate rate of speed and passing such fibers through a slip of powdered glass, solvent and plasticizer to impregnate the tow. The impregnated fibers are then rewound onto a large rotating spool. An exemplary slip composition may be composed of 250 grams of powdered glass in 780 ml of propanol. An alternative composition may comprise 85 grams of the glass and 200 grams of propanol, 10 grams of polyvinyl alcohol and 5 drops (approx. 1 cc.) of a wetting agent, Tergitol ®. The receiving drum is preferably run at 1 revolution per minute or linear speed of 5 feet per minute (2.54 cm per second). Excess glass and solvent can be removed by pressing a squeegy against the drum as it winds. Preferably the ground glass is sized so that 90% of it passes through a −325 mesh sieve. Th thus impregnated tape is then dried either at ambient temperature or with a radiant heating source to remove solvent.

Following the impregnation, the fiber is removed from the drum and cut into strips up the diameter of the mirror to be fabricated. While the typical test samples made were about 10 cm in diameter, mirrors up to 20 cm in diameter have also been made by the processes of the present invention. However, mirrors of even larger diameters can be made according to the present invention. The fibers are then preferably laid in alternating ply stack-up sequence of 0° and 90°, around the channel forming strips as described below. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000-2000 psi) and temperatures of 1050°-1450° C. Additional glass in the form of powder may also be inserted between each layer as it is laid in an attempt to achieve a preferred 40-70% by volume loading of graphite fiber in the composite. Also, the mold can be vibrated to insure uniform distribution of the glass over the laid fiber surfaces.

Figure 2:
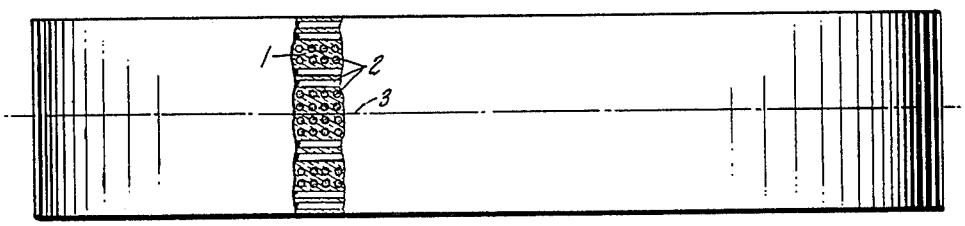
FIG. 2 shows a partially sectioned side view of a composite mirror according to the present invention.

While alternating 0° and 90° fiber laying was the most common test sample arrangement used (See FIG. 1), 0° and 45°; 0°, 45° and 90°; 0°, 30° and 90°; 0° and 60°; etc., fiber laying can also be used. In fact, the 0°, 45° and 90°, and 0° and 60° fiber laying give additional advantage of isotropy of elastic stiffness. It is preferred that the composite mirror (absent the cooling channels) be both balanced and have a central plane of symmetry as described in commonly assigned, copending U.S. patent application Ser. No. 54,098, filed July 2, 1979, the disclosure of which is incorporated by reference. This is specifically demonstrated by FIG. 2 which is the end view of a 0° and 90° specimen where 1 indicates the glass matrix, 2 indicates the graphite fibers and 3 indicates the central plane of symmetry.

Figure 3:
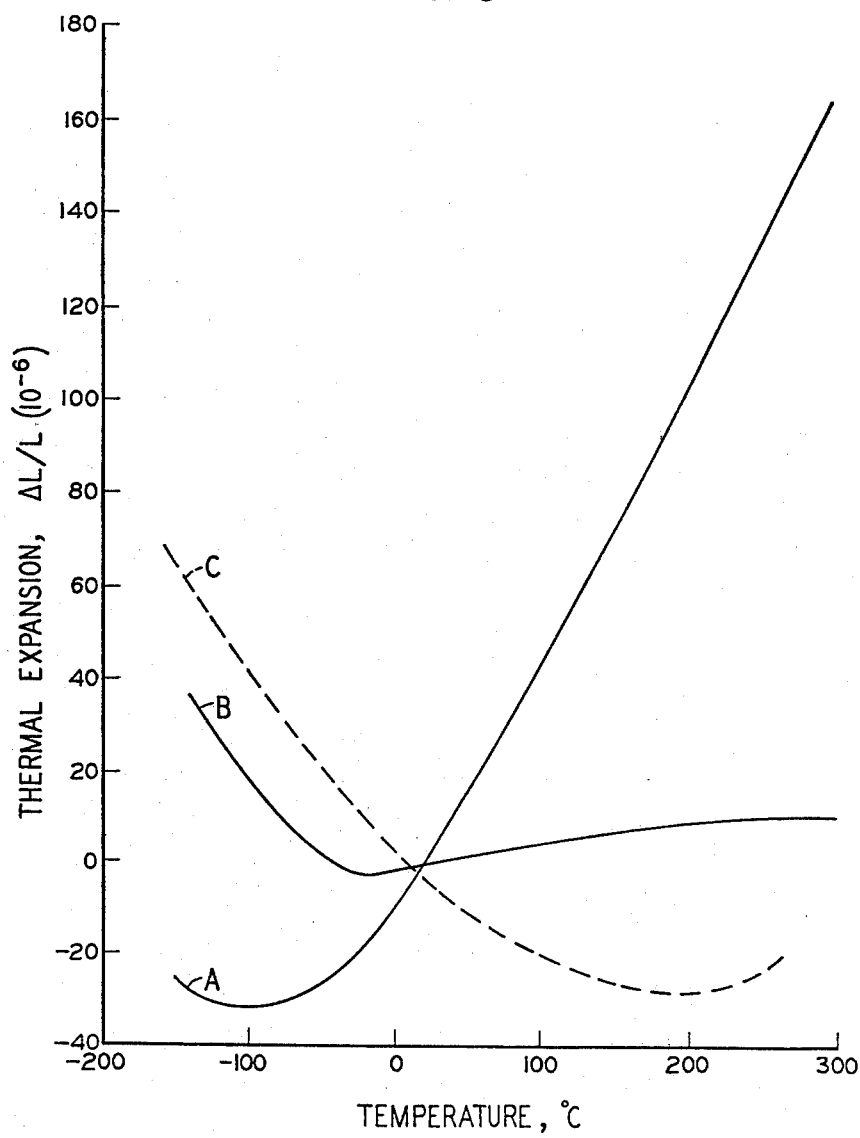
FIG. 3 shows the thermal expansion characteristics of a composite material of the present invention.

As can be seen from FIG. 3, the thermal expansion characteristics of a 0° and 90° graphite-glass lay-up are on a par with other conventional materials known for their dimensional stability. Curve A represents unreinforced fused silica (N.B.S. reference number 739 measurement). Reference B represents unreinforced ULE glass (Corning Glass Works Code 7971 measurement). And Reference C represents the 0° and 90° graphite glass of the present invention. Because of its superiority in other properties of strength, stiffness, thermal conductivity, and toughness, the graphite reinforced glass is the overall superior material.

Energy absorbed by the mirror due to light beam impingement on the reflective optical surface causes distortion of the mirror and reduces the quality of the optical component. This distortion can be reduced by removing the absorbed heat energy through the use of a cooling media. The closer this cooling is to the optical surface, the more reduction there is in thermal induced distortion. However, if the channels are too close to the optical surface, the distortion from the coolant pressure will be greater than the thermal distortion. The placement of the coolant channels is, therefore, a trade between the thermal and pressure induced distortions. A typical channel placement based on metal optics is 0.015 inch (0.038 cm) from the optical surface. Minimum distance for cooling channels would be about 0.0005 inch (0.013 cm) from the optical surface; maximum distance is primarily controlled by the material conductivity and approximately 0.030 would be as large as practical for cooling the optical surface. Anything larger than that would tend to control the temperature of the total mirror similar to the backside cooling of the thermally stabilized mirror of commonly assigned U.S. Pat. No. 4,221,469. Close proximity, therefore, means the cooling channels are as close as practical to the optical surface with the above considerations in mind.

As described above, the methods of making the cooled, thermally stable composite mirrors of the present invention follow three basic lines. It should be understood that whenever graphite fiber-glass admixture laying or hot pressing is called for below, the above described procedures are preferred. According to the first embodiment of such methods, a series of glass impregnated graphite fibers are laid up in a 0° and 90°; 0°, 30° and 60°; or 0°, 45° and 90° orientation as described above optionally with glass powder inserted between each layer of laid fibers to a height two or three layers below the intended optical surface, e.g. about 0.015 inch (0.038 cm) below the mirror surface after pressing. Such proximity of coolant passages to the optical surface is generally not attainable with state of the art mirror technology and certainly not attainable with the ease of fabrication of the present invention. Generally, this composition laying is continued until approximately 50-75 layers of material are laid. The channel forming strips are next laid. The channel forming strips are preferably high temperature stable metal wires or tubes, such as molybdenum or molybdenum alloys, nickel or Inconel. However, any high temperature stable inserts or even inserts in powdered form, such as for example, powdered ceramic can be used, the only requirement being removability of the inserts with relative ease by conventional mechanical (pulling or drilling) or chemical (etching) means. Another advantage of the methods of the present invention is the versatility provided in both channel design and channel shape since the inserts can be laid in almost any pattern desired, can be flattened on one or more sides and can be of circular, square, rectangular, etc. cross section. Typical dimensions of the channels formed by the use of such inserts are of circular cross section with a radius of about 0.035 inch (0.089 cm), but in any case should be of sufficient diameter to allow the coolant fluid to flow freely through the mirror. Metal wires such as molybdenum are then laid in the cooling pattern desired, generally parallel strips 0.025 inch (0.064 cm) apart extending beyond the borders of the laid fiber-glass composite. This also represents an improvement over state of the art technology which does not allow for such freedom of cooling pattern design. Two or three layers of graphite impregnated with the glass are then laid on top of the wires to produce the optical surface. The composite is then compressed for example at 1200° C. and 1,000 psi ($7.03 \times 10^5$ kg per square meter) for an hour.

Figure 4:
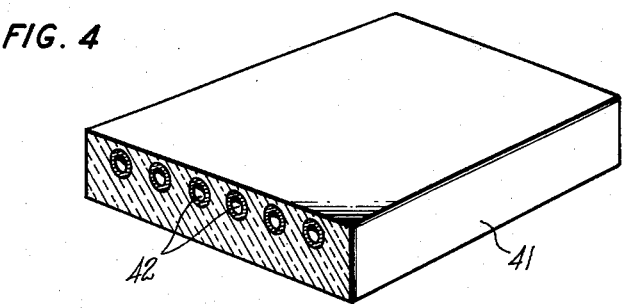
FIG. 4 shows a channel insert-graphite glass composite according to the present invention.

Following consolidation of the composite by such method, if metal wire or small bars are used, the wires or bars (e.g. 0.070 inch (0.178 cm) in diameter) are freed from the composite by mechanical pushing or pulling. To assit in removal, the wires can be treated with a material such as graphite powder prior to insertion into the composite. Optionally, metal tubes (or rods) can be used and removed by treatment with a warm 50% aqueous solution of nitric acid followed by rinsing with water. Note FIG. 4 where 41 is the graphite-glass composite material and 42 the metal tubes.

Figure 5:
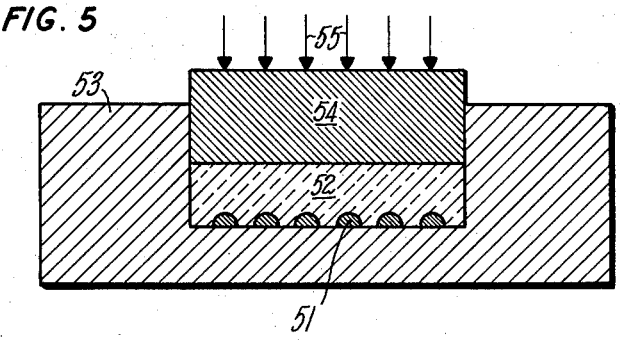
FIG. 5 shows a molding process according to the present invention.

An alternative method of producing the cooling grooved mirror of the present invention comprises first hot pressing a plate of the graphite glass composite by the method described above absent the inserts. Following this, a series of small diameter, e.g. 0.070 inch (0.178 cm) wires such as molybdenum, preferably flattened on one side are laid in the desired cooling groove pattern on a mold and layers of graphite and glass are subsequently built up on said wires. The mold (preferably molybdenum or graphite) is then used as a base upon which to hot press the composite. Note FIG. 5 where 51 represents the wire inserts, 52 the graphite-glass, 53 the mold, 54 the ram subject to the compressive force 55. Upon cooling the wires are readily and easily mechanically removed (e.g. by pulling). Here also, chemical freeing could be used but in view of the accessibility of the wires, mechanical removal is more expedient. Furthermore, by using mechanical removal the wires may be reused for subsequent mirror formation.

Figure 6:
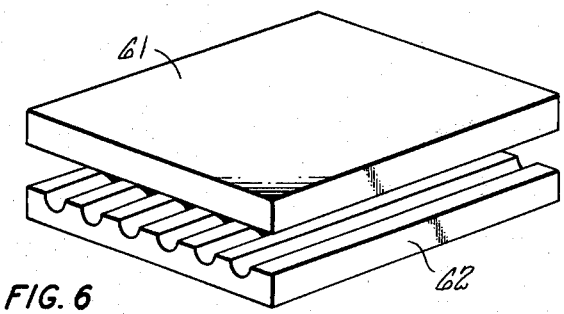
FIG. 6 shows a laminating process according to the present invention.

Following formation of this second plate, the two plates may be laminated together. Note FIG. 6 where 61 is the preferred graphite-glass composite absent the cooling grooves and 62 is the grooved composite formed as described above. Such lamination can be by a variety of methods, for example, utilizing a conventional epoxy or the glass of the matrix in powdered form or any of the methods described in commonly assigned U.S. Pat. application Ser. Nos. 215,281; 215,282; and 215,283 filed Dec. 12, 1980, the disclosures of which are incorporated by reference. As described in Ser. No. 215,281, the pieces to be joined are first ground flat or to matching contours. Gold or other suitable metal is then sputtered onto the surfaces to be joined. Gold-tin foil or other suitable braze material is placed between the surfaces and the assembly heated to the melting point of the braze. Such brazing is preferablydone in a non-oxidizing atmosphere such as argon or hydrogen. Or as described in Ser. No. 215,282, the two surfaces to be joined can be bonded with a glass composition comprising a high lead oxide content glaze (Drakenfeld E1576) and beta-spodumene. Modifiers such as fine particle colloidal silica in water can also be included (DuPont Ludox). The bonding process includes applying a slurry of the glass composition to the surfaces to be bound followed by drying and hot pressing the surfaces together. The hot pressing can take place, for example, in argon at a pressure of up to 300 psi ($3.52 \times 10^5$ kg per square meter) for about 20 minutes at temperatures in the order of 750° C. An exemplary composition comprises 25 grams of Drakenfeld E1576, 25 grams of Al-95 and 2 grams of Ludox in 200 Ml of isopropyl alcohol. Al-95 is a 98% beta-spodumene glass manufactured by Research Organics/Inorganic Chemical Corporation, Sun Valley, California. The process can best be described as a transition liquid phase bonding.

The parts can also be bonded as described in Serial No. 215,283. The surfaces of the two parts to be bonded are ground to remove excess glass. The parts can be cleaned ultrasonically in methanol and heated at 200° C. for one hour. An approximately 800 Å thick layer of chromium is then sputtered onto the top surfaces of the two pieces followed by sputtering approximately 1 micron of gold onto the same surfaces. The two pieces are then placed face to face on a hot plate at 280° C. and soldered together utilizing a eutectic alloy of 80% gold, and 28% tin. Other variations of this theme can be employed such as precoating with nickel and utilizing a nickel based solder. The same is true of copper, silver, gold, nichrome, chromium and other metals and their respective solders. The metal inserts may be removed or not before lamination depending on mirror design. Also, if the inserts are removed prior to lamination, ceramic or metal powder can be inserted to guard against channel closure during lamination if desired. Such powder can be removed after lamination by simple fluid rinsing, e.g. with water.

A third method for forming channel cooled mirrors of the present invention comprises first forming the basic graphite-glass composite as described above absent inserts. The composite is then grooved to the depth of approximately 0.15 inch (0.38 cm) for example, in the pattern desired for the cooling grooves in the mirror. It should be noted that any thickness wire, any depth groove and any pattern desired may be used. Following this, the channel forming inserts such as molybdenum, Inconel, or nickel wire approximately 0.02 inch (0.05 cm) thick for example, are fitted into the formed grooves. Glass powder is placed in the grooves and on top of the metal strips to insure snug fit. The composite is placed in a mold and layers of the graphite glass composition piled atop the filled grooves. The composite is then hot pressed as described above. Hot nitric acid (50% aqueous) is then used to chemically remove the metal strips, optionally followed by rinsing with water.

Another method of forming such channels includes utilizing any of the above described methods with a channel forming insert which is wrapped with graphite or other high temperature stable fibers such as silicon carbide, followed by removing the insert. After removal of the insert, the result is that each coolant passage is lined with a circumferentially oriented fiber. With fibers in this orientation, the coolant pressure is easily restrained by the reinforced passage walls. Another advantage of such an orientation is the improved distribution of heat around the passage due to the thermal conductivity of the fibers.

In all instances described above, composite mirrors with cooling groove patterns are produced with not only high thermal stability and dimensional integrity, but mirrors which can be used over a range of operating temperatures by virtue of the inclusion of cooling grooves close to the optical surfaces of the mirrors. This represents a distinct advantages over the prior art since cooling grooves as close to the reflecting surface as produced by the methods of the present invention are generally unobtainable with the relative ease of fabrication of the present invention. Furthermore, such versatility of pattern design is also generally unobtainable in the prior art.

It should also be noted that as stated above, while any cooling channel design may be used, the preferred arrangement is to have the cooling channels in a plane substantially parallel to the plane of the mirror reflecting surface, the individual channels also being substantially parallel to each other.

Following formation of the mirrors according to the present invention, the composite surface is coated with conventional laser radiation reflecting layers such as chromium-gold alloys by conventional methods such as vapor deposition and cathode sputtering.

Environmental temperature of cooled mirrors is generally from −70° F. to +150° F. (−56.7° C. to 65.6° C.) with conventional cooling additives used to prevent coolant freezing. Some mirror applications could expand this range from −150° F. to +150° F. (−101.1° C. to 65.6° C.). Operating temperatures of mirrors according to the present invention will probably be in the 50° F. to 100° F. (10° C. to 37.8° C.) range.

Although the invention has been shown and described with respect to detailed embodiments thereof, it will be understood by those skilled in the art that various changes in form and detail thereof may be made without departing from the spirit and scope of the claimed invention.

We claim:

1. A laser mirror comprising a graphite fiber reinforced glass matrix containing 40% to 70% by volume graphite fibers, having a graphite fiber orientation in the composite of 0° and 90°; 0°, 45° and 90°; or 0° and 60°; a laser radiation reflecting outer layer and cooling channels within close proximity of the laser radiation reflecting outer layer.

2. The laser mirror of claim 1 containing about 60% by volume graphite fiber.

3. The laser mirror of claim 1 wherein the glass comprises borosilicate.

4. The laser mirror of claim 1 wherein the graphite fiber has a modulus of elasticity of at least 531 GPa, a tensile strength of at least 1724 MPa and a density of about 1.96 gm/cm$^3$.

5. The laser mirror of claim 1 wherein the cooling channels are in a plane substantially parallel to the laser radiation reflecting surface and substantially parallel to each other.

* * * * *